United States Patent [19]
Reisacher

[11] Patent Number: 6,143,402
[45] Date of Patent: Nov. 7, 2000

[54] PIGMENT PREPARATIONS IN PELLET FORM BASED ON ORGANIC PIGMENTS COATED WITH RESIN MIXTURES

[75] Inventor: Hansulrich Reisacher, Maxdorf, Germany

[73] Assignee: BASF Aktiengesellschaft, Ludwigshafen, Germany

[21] Appl. No.: 09/133,563

[22] Filed: Aug. 13, 1998

[30] Foreign Application Priority Data

Aug. 16, 1997 [DE] Germany .......................... 197 35 487

[51] Int. Cl.⁷ ...................................................... B32B 5/16
[52] U.S. Cl. ........................ 428/323; 428/327; 428/407; 106/493; 106/499; 427/212; 427/487
[58] Field of Search ..................................... 428/323, 407, 428/327; 106/493, 499; 427/212, 487

[56] References Cited

U.S. PATENT DOCUMENTS

| | | | |
|---|---|---|---|
| 3,615,812 | 10/1971 | Clark | 106/308 M |
| 4,188,236 | 2/1980 | Robertson et al. | 106/308 Q |
| 4,264,552 | 4/1981 | McMahon et al. | 264/117 |
| 4,334,932 | 6/1982 | Roueche | 524/191 |
| 4,464,203 | 8/1984 | Belde et al. | 106/308 N |
| 4,469,516 | 9/1984 | Schneider et al. | 106/23 |
| 4,543,380 | 9/1985 | Schneider et al. | 524/159 |
| 4,729,796 | 3/1988 | Deubel et al. | |
| 4,981,489 | 1/1991 | Ruff et al. | |
| 5,298,535 | 3/1994 | Kammer | 524/190 |
| 5,453,151 | 9/1995 | Bäbler | |
| 5,814,140 | 9/1998 | Reisacher et al. | |
| 5,880,209 | 3/1999 | Patzschke et al. | 524/541 |
| 5,985,019 | 11/1999 | Mccrae et al. | 106/413 |

FOREIGN PATENT DOCUMENTS

| | | |
|---|---|---|
| 0 050 313 B2 | 4/1982 | European Pat. Off. . |
| 0 263 951 B1 | 4/1988 | European Pat. Off. . |
| 0 665 272 | 8/1995 | European Pat. Off. . |
| 0 770 648 | 5/1997 | European Pat. Off. . |
| 0 796 900 | 9/1997 | European Pat. Off. . |
| 1 576 477 | 8/1969 | France . |
| 33 27 562 | 2/1985 | Germany . |

*Primary Examiner*—H. Thi Le
*Attorney, Agent, or Firm*—Oblon, Spivak, McClelland, Maier & Neustadt, P.C.

[57] ABSTRACT

Pigment preparations in pellet form wherein the organic pigment particles are coated with a mixture of a resin (A) having an acid number $\geq 200$ and a resin (B) having an acid number $<200$ are useful for pigmenting printing inks.

11 Claims, No Drawings

PIGMENT PREPARATIONS IN PELLET FORM BASED ON ORGANIC PIGMENTS COATED WITH RESIN MIXTURES

The present invention relates to novel pigment preparations in pellet form, wherein the organic pigment particles are coated with a mixture of a resin (A) having an acid number ≧200 and a resin (B) having an acid number <200.

The invention further relates to the production of these pigments and to their use for pigmenting printing inks.

It will be known that when organic pigments are synthesized they are obtained in a form which on direct incorporation into binder systems for inks or paints leads to poor rheological properties and unsatisfactory color properties on the part of the pigmented systems. The pigments are therefore given an additional treatment, for example a coating with resin, in an attempt to improve their application properties.

The coating with the resin is frequently effected by adding the resin in the form of an aqueous alkali metal resinate solution to a neutral or alkaline aqueous pigment suspension and then acidifying the mixture to precipitate the resin as resin acid onto the pigment particles, although the addition of dissolved metal salts will convert the resin acid into the resin soap to some extent. The pigments are then isolated as powder by filtration and drying.

The resin-coated pigments, comprising up to 50% or more by weight of resin, have advantageous color properties, such as high gloss, high transparency and, despite the resin content, a color strength similar to that of the resin-free pigments, and also favorable rheological properties, and are usually used for producing printing inks, especially letterpress and offset printing inks.

Compared with pulverulent pigment preparations, pigment pellets cause much less of a dust nuisance and are free flowing and are therefore gaining increasing interest. They are advantageously produced by collecting the pigment, if desired after pretreatment, as water-moist filter cake, which is then forced through a pelletizing die. The subsequent drying can take place, for example, continuously on a belt dryer. The pellets obtained in this way are customarily 0.3–0.8 cm in thickness and from 0.5–2 cm in length.

However, it is difficult to pelletize pigments having a high resin content, since the filter cake will usually no longer have the requisite plasticity.

EP-A-50 313 discloses the use of flushing to prepare a pigment granulate coated with a resin having an acid number within the range from 145 to 165 or with a mixture of such resins. Granulation is effected by passing steam into the aqueous suspension.

It is an object of the present invention to provide further pigment preparations having advantageous application properties.

We have found that this object is achieved by a pigment preparation in pellet form, wherein the organic pigment particles are coated with a mixture of a resin (A) having an acid number ≧200 and a resin (B) having an acid number <200.

The present invention also provides a process for producing a pigment preparation, which comprises coating the pigment particles, suspended in an aqueous medium, with said resin mixture, collecting the resin-coated pigment on a filter means, pelletizing the moist filter cake via a pelletizing die and drying the pellets.

Lastly, the present invention provides for the use of this pigment preparation for pigmenting printing inks.

The essential feature of the pigment pellets of the present invention is that the organic pigment particles are coated with a mixture of a resin (A) having an acid number ≧200 and of a resin (B) having an acid number <200.

Preferably, the acid number of resin (A) is within the range from 240 to 320 and particularly preferably it is within the range from 280 to 320. The acid number of resin (B) is preferably within the range from 100 to <200, especially within the range from 140 to 195.

It is surprising that organic pigments coated with the resin mixture of the present invention are highly suitable for pelletization.

In general, this resin mixture comprises from 1 to 80% by weight, preferably from 1 to 50% by weight, of resin (A) and from 20 to 99% by weight, preferably from 50 to 99% by weight, of resin (B).

In principle, the resin mixture of the present invention may include any natural, semisynthetic or synthetic resin whose acid number is within the stated ranges, although "acidic" resins, i.e., carboxyl-bearing resins, are preferable for resin (B), too.

Examples of particularly suitable resins are acrylate and polyester resins and especially rosins such as rosin itself and its well-known derivatives, e.g., dimerized, polymerized, hydrogenated and disproportionated rosin and the reaction products with maleic acid and fumaric acid which customarily have acid numbers ≧200.

The resin content of the pigment preparations of the present invention is generally within the range from 20 to 55% by weight, preferably within the range from 30 to 50% by weight.

The higher the resin content is, the higher the level of resin (A) should be.

The pigment can be any organic pigment in finely divided form. Examples of suitable pigment classes are monoazo, disazo, anthraquinone, anthrapyrimidine, quinacridone, quinophthalone, diketopyrrolopyrrole, dioxazine, flavanthrone, indanthrone, isoindoline, isoviolanthrone, perinone, perylene, phthalocyanine, pyranthrone, and thioindigo pigments and mixtures thereof.

Of particular interest are unlaked azo pigments, especially β-naphthol and naphthol AS pigments as monoazo pigments and bisacetoacetarylide, disazopyrazolone and especially diaryl yellow pigments as disazo pigments.

The following pigments of the individual classes are mentioned by way of example:

| | |
|---|---|
| monoazo pigments: | C.I. Pigment Brown 25; |
| | C.I. Pigment Orange 1, 5, 36 and 67; |
| | C.I. Pigment Red 1, 2, 3, 112, 146, 170 and 184; |
| | C.I. Pigment Yellow 1, 2, 3, 73, 74, 65 and 97; |
| disazo pigments: | C.I. Pigment Orange 16 and 34; |
| | C.I. Pigment Red 144 and 166; |
| | C.I. Pigment Yellow 12, 13, 14, 17, 83, 106, 113, 114, 126, 127, 174, 176 and 188; |
| anthraquinone pigments: | C.I. Pigment Yellow 147; |
| | C.I. Pigment Violet 31; |
| anthrapyrimidine pigments: | C.I. Pigment Yellow 108; |
| quinacridone pigments: | C.I. Pigment Red 122 and 202; |
| | C.I. Pigment Violet 19; |
| quinophthalone pigments: | C.I. Pigment Yellow 138; |
| dioxazine pigments: | C.I. Pigment Violet 23 and 37; |
| flavanthrone pigments: | C.I. Pigment Yellow 24; |
| indanthrone pigments: | C.I. Pigment Blue 60 and 64; |
| isoindoline pigments: | C.I. Pigment Orange 69; |
| | C.I. Pigment Red 260; |
| | C.I. Pigment Yellow 139 and 185; |

| | -continued |
|---|---|
| isoindolinone pigments: | C.I. Pigment Yellow 109, 110 and 173; |
| perinone pigments: | C.I. Pigment Orange 43; |
| | C.I. Pigment Red 194; |
| perylene pigments: | C.I. Pigment Black 31 and 32; |
| | C.I. Pigment Red 123, 149, 178, 179, 190 and 224; |
| | C.I. Pigment Violet 29; |
| phthalocyanine pigments: | C.I. Pigment Blue 15, 15:1, 15:2, 15:3, 15:4, 15:6 and 16; |
| | C.I. Pigment Green 7 and 36; |
| pyranthrone pigments: | C.I. Pigment Orange 51; |
| | C.I. Pigment Red 216; |
| thioindigo pigments: | C.I. Pigment Red 88; |
| C.I. Pigment Black 1 (aniline black); | |
| C.I. Pigment Yellow 101 (aldazine yellow). | |

The pigment preparations of the invention may include further additives which are customary for the respective pigment. In the case of azo pigments, for example, known coupling assistants such as surfactants, long-chain fatty acids and amines and crystallization inhibitors such as the coupling product of bisdiazotized 4,4'-diaminobiphenyl-2,2'-disulfonic acid and acetoacet-m-xylidide (EP-A-263 951) may be present. These additives can be present in the pigment preparations in an amount of up to 15% by weight.

The pigment pellets of the invention can advantageously be obtained by the production process of the invention by coating the pigment particles, suspended in a preferably alkaline aqueous medium, with the mixture of resin (A) and resin (B), then collecting the resin-coated pigment on a filter means, pelletizing the moist filter cake via a pelletizing die and drying the pellets.

The process of the present invention is advantageously carried out as follows:

The aqueous pigment suspension (which, for example in the case of azo pigments, can advantageously be the suspension obtained in pigment synthesis) is initially rendered alkaline, i.e., adjusted to a pH which is generally within the range from 8 to 13, preferably within the range from 9 to 12, and then admixed with alkaline aqueous solutions of resins (A) and (B) (alkali metal resinate solutions), simultaneously or successively. The pH of the suspension following addition of the resin is customarily within the range from 9 to 12.

The suspension is then heated to about 90–100° C. This heat treatment generally takes from 15 to 60 min.

However, it is also possible first to heat the basified pigment suspension and then to add the resin solutions and effect the further heat treatment. Another version in the case of azo pigments involves adding the resins during pigment synthesis (coupling).

The pH of the suspension is then adjusted to customarily 3–8, preferably 4.5–7, with an acid, preferably dilute hydrochloric acid.

If desired after further brief heating or stirring, the resin-coated pigment is filtered off, the moist filter cake is pelletized and the pellets are dried.

The pellet-form pigment preparations of the present invention are advantageously useful for pigmenting printing inks, including especially letterpress and offset printing inks, and are notable in this application for advantageous application properties, especially good gloss, high color strength, good viscosity and ready dispersibility in the application medium.

EXAMPLES

Preparation and testing of pigment preparations according to the invention a) First, the following azo pigments were prepared:

C.I. Pigment Yellow 13:

The tetrazo component was prepared by admixing a suspension of 28 g of 3,3'-dichloro-4,4'-diaminobiphenyl (3,3'-dichlorobenzidine) in 600 ml of 1 N hydrochloric acid with 15.3 g of sodium nitrite at 0° C. Excess nitrous acid was then removed with amidosulfuric acid, after which the solution was filtered off.

The coupling component was prepared by dissolving 47.6 g of acetoacet-2,4-dimethylanilide in 305 ml of 1.5 N sodium hydroxide solution.

The coupling vessel was charged with 310 ml of 0.5 N acetic acid. Sufficient coupling component was then added to obtain a pH of 5.0. Thereafter the tetrazo component and the rest of the coupling component were added simultaneously while the pH was maintained at 4.5 and the temperature at 20° C.

After the coupling reaction had ended, a pH of 11 was set with 17 ml of 25% strength by weight sodium hydroxide solution, at which point a tetrazo component prepared by tetrazotization of 1.2 g of 4,4'-diaminobiphenyl-2,2'-disulfonic acid in 16 ml of 1 N hydrochloric acid at 0° C. with 0.5 g of sodium nitrite was added.

C.I. Pigment Yellow 12:

The pigment suspension was prepared similarly to C.I. Pigment Yellow 13 by coupling of 28 g of tetrazotized 3,3'-dichlorobenzidene with 41.1 g of acetoacetanilide.

C.I. Pigment Yellow 14:

The pigment suspension was prepared similarly to C.I. Pigment Yellow 13 by coupling of 28 g of tetrazotized 3,3'-dichlorobenzidene with 44.3 g of 2-methylacetoacetanilide.

C.I. Pigment Yellow 174:

The pigment suspension was prepared similarly to C.I. Pigment Yellow 13 by coupling of 28 g of tetrazotized 3,3'-dichlorobenzidene with 23.8 g of 2,4-dimethylacetoacetanilide and 22.2 g of 2-methylacetoacetanilide.

b) For subsequent coating of the pigment particles with resin, complete reaction of the tetrazonium salt was followed in all cases by addition to the pigment suspension of a solution of x g of fumaric acid-modified rosin (Colophane®25F, from Willers, Engel & Co.; acid number 310) as resin (A) in $x_1$ ml of 0.3 N sodium hydroxide solution and of a solution of y g of partially hydrogenated rosin (Staybelite®E resin, from Hercules; acid number 165) as resin (B) in $y_1$ ml of 0.3 N sodium hydroxide solution with stirring.

Following 30 minutes' heating at 95° C., the pH of the suspension was adjusted to 5 by addition of 1 N hydrochloric acid.

Following a subsequent 15 minutes of stirring at 95° C. and cooling back to 60° C., the resin-coated pigment was filtered off. The filter cake was forced with a manual press through a pelletizing die (whole diameter 0.4 cm), which presented no problems in any of the examples. The pellets were then dried at 60° C.

c) To enable the color strength from the resin-coated pigments to be determined, printing inks were prepared by stirring, in each case, 7.5 g of the resin-coated pigment into 42.5 g of a varnish composed of 40% by weight of rosin-modifed phenolic resin, 27% by weight of refined linseed oil and 33% by weight of PKWF 6/9 mineral oil (from Haltermann) and then dispersing with a Dispermat dissolver (toothed disk diameter 0.3 cm) at 12000 rpm at 50° C. for 10 min. The predispersed paste was then ground three times on an SDY 200 three-roll mill (from Bühler) at a nip pressure of 10 bar.

The color strength is reported in terms of coloring equivalents (CE) and was determined via the white reduction of the printing ink with a white paste. To this end, 0.5 g of printing ink was admixed with 10 g of a 40% by weight pigment content white paste on a JEL 25/53 disk grinder (from Engelsmann) by 4×35 revolutions.

Similar preparations of the difficult-to-pelletize pigments C1 to C7 each coated only with resin (B) were assigned the CE value 100 (standard). CE values <100 mean a higher color strength than that of the standard, while CE values >100 accordingly denote a lower color strength.

Further details of these experiments and their results are shown in the following table:

TABLE

| Ex. | Pigment | Proportion of resin mixture [% by wt.] | x g of resin (A) | $x_1$ ml of NaOH | y g of resin (B) | $Y_1$ ml of NaOH | CE |
|---|---|---|---|---|---|---|---|
| 1 | P.Y. 13 | 40 | 12.6 | 160 | 37.8 | 490 | 100 |
| 2 | P.Y. 13 | 40 | 25.2 | 325 | 25.2 | 325 | 104 |
| 3 | P.Y. 13 | 40 | 37.8 | 490 | 12.6 | 160 | 110 |
| C1 | P.Y. 13 | 40 | — | — | 50.4 | 650 | 100 |
| 4 | P.Y. 13 | 45 | 31.0 | 380 | 31.0 | 380 | 105 |
| C2 | P.Y. 13 | 45 | — | — | 62.0 | 760 | 100 |
| 5 | P.Y. 12 | 40 | 11.6 | 150 | 34.8 | 450 | 101 |
| 6 | P.Y. 12 | 40 | 23.2 | 300 | 23.2 | 300 | 102 |
| C3 | P.Y. 12 | 40 | — | — | 46.4 | 600 | 100 |
| 7 | P.Y. 14 | 40 | 12.1 | 155 | 36.3 | 465 | 100 |
| 8 | P.Y. 14 | 40 | 24.2 | 310 | 24.2 | 310 | 102 |
| C4 | P.Y. 14 | 40 | — | — | 48.4 | 620 | 100 |
| 9 | P.Y. 174 | 40 | 12.2 | 158 | 37.0 | 472 | 101 |
| 10 | P.Y. 174 | 40 | 24.6 | 315 | 24.6 | 315 | 102 |
| C5 | P.Y. 174 | 40 | — | — | 49.2 | 630 | 100 |
| 11 | P.Y. 174 | 45 | 15.1 | 195 | 45.3 | 585 | 100 |
| 12 | P.Y. 174 | 45 | 30.2 | 390 | 30.2 | 390 | 101 |
| C6 | P.Y. 174 | 45 | — | — | 60.4 | 780 | 100 |
| 13 | P.Y. 174 | 50 | 18.5 | 237 | 55.5 | 713 | 100 |
| 14 | P.Y. 174 | 50 | 37.0 | 475 | 37.0 | 475 | 102 |
| C7 | P.Y. 174 | 50 | — | — | 74.0 | 950 | 100 |

What is claimed is:

1. A pelleted pigment formulation, comprising:

particles of organic pigment coated with a mixture of a resin (A) having an acid number ≧200 and a resin (B) having an acid number of 100 to less than 200.

2. The pelleted pigment formulation as claimed in claim 1, wherein the resin mixture comprises from 10 to 80% by weight of said resin (A) and from 20 to 99% by weight of said resin (B).

3. The pelleted pigment formulation as claimed in claim 1, comprising resins based on rosin.

4. The pelleted pigment formulation as claimed in claim 1, wherein the resin mixture comprises from 20 to 55% by weight of the formulation.

5. The pelleted pigment formulation as claimed in claim 1, wherein the organic pigment is an unlaked azo pigment.

6. The pelleted pigment formulation as claimed in claim 1, wherein the resin mixture comprises from 1 to 50% by weight of resin (A) and from 50 to 99% by weight of resin (B).

7. The pelleted pigment formulation as claimed in claim 1, wherein the pigment is a monoazo, disazo, anthraquinone, anthrapyrimidine, quinacridone, quinophthalone, diketopyrrolopyrrole, dioxazine, flavanthrone, indanthrone, isoindoline, isoviolanthrone, perinone, perylene, phthalocyanine, pyranthrone, thioindigo pigment or mixtures thereof.

8. A process for producing the pelleted pigment formulation as claimed in claim 1, which comprises:

coating particles of organic pigment suspended in an aqueous medium, with said resin mixture;

collecting the resin-coated pigment as a moist filter cake on a filter means; and pelletizing the moist filter cake via a pelletizing die and drying the pellets.

9. The process as claimed in claim 8, wherein the pigment particles are coated with said resin mixture by directly heating the pigment particles and the dissolved resins in an alkaline aqueous medium and then precipitating the resins onto the pigment particles by addition of an inorganic or organic acid.

10. The process as claimed in claim 9, wherein the pH of the alkaline aqueous medium is adjusted to ≧8.

11. A method of pigmenting printing inks, comprising:

incorporating the pelleted pigment of claim 1 into a printing ink vehicle.

* * * * *